US012382951B2

(12) United States Patent
Kruger

(10) Patent No.: US 12,382,951 B2
(45) Date of Patent: Aug. 12, 2025

(54) ELK CALL

(71) Applicant: Charles Bronson Kruger, Westbank (CA)

(72) Inventor: Charles Bronson Kruger, Westbank (CA)

(*) Notice: Subject to any disclaimer, the term of this patent is extended or adjusted under 35 U.S.C. 154(b) by 246 days.

(21) Appl. No.: 18/337,874

(22) Filed: Jun. 20, 2023

(65) Prior Publication Data
US 2024/0023539 A1  Jan. 25, 2024

Related U.S. Application Data

(60) Provisional application No. 63/368,986, filed on Jul. 21, 2022.

(51) Int. Cl.
A63H 5/00 (2006.01)
A01M 31/00 (2006.01)

(52) U.S. Cl.
CPC ............. *A01M 31/004* (2013.01); *A63H 5/00* (2013.01)

(58) Field of Classification Search
CPC ............................... A01M 31/004; A63H 5/00
See application file for complete search history.

(56) References Cited

U.S. PATENT DOCUMENTS

| | | | | | |
|---|---|---|---|---|---|
| 3,772,823 | A | * | 11/1973 | Herter | A01M 31/004 446/209 |
| 3,813,811 | A | * | 6/1974 | Herter | A01M 31/004 446/193 |
| 4,335,539 | A | * | 6/1982 | Jones | A63H 5/00 446/486 |
| 5,445,551 | A | * | 8/1995 | Ady | A01M 31/004 446/209 |
| 5,643,039 | A | * | 7/1997 | McIntyre | A01M 31/004 446/208 |
| 6,042,447 | A | * | 3/2000 | Thompson | A01M 31/004 446/193 |
| 6,179,684 | B1 | * | 1/2001 | Carlton | A01M 31/004 446/207 |
| 6,471,563 | B1 | * | 10/2002 | Carlton | A01M 31/004 446/213 |
| 11,659,831 | B2 | * | 5/2023 | Meline | A01M 31/004 446/202 |
| 2002/0009946 | A1 | * | 1/2002 | Primos | A63H 5/00 446/207 |

* cited by examiner

Primary Examiner — John A Ricci
(74) Attorney, Agent, or Firm — Orin Del Vecchio

(57) ABSTRACT

An elk call that is configured to produce a desired sound effect capable of attracting elk during an elk hunt. The present invention includes a body wherein the body is manufactured from a flexible plastic tubing. The body has a hollow passage intermediate the first end and second end. The body is encompassed in insulation and wherein the insulation is completely covered in an outer covering. The exterior surface of the body is formed to produce a desired sound effect when raking against a tree. The present invention includes alternate embodiments of mouthpieces secured to the first end. A baffle member is coupled to the second end of the body and includes a first notch and a second notch formed in the wall of the baffle member on opposing sides of the opening of the baffle member.

7 Claims, 4 Drawing Sheets

ELK CALL

PRIORITY UNDER 35 U.S.C. SECTION 119(E) & 37 C.F.R. SECTION 1.78

This nonprovisional application claims priority based upon the following prior United States Provisional Patent Application entitled: Elk Call, Application No.: 63/368,986 filed Jul. 21, 2022, in the name of Charles Bronson Kruger, which is hereby incorporated by reference for all purposes.

FIELD OF INVENTION

The present invention relates generally to hunting accessories, more specifically but not by way of limitation, an elk call that is operable to produce sounds such as an elk bugle and thrashing.

BACKGROUND

Elk hunting is a popular sport with thousands of hunters and each season these hunters participate in hunting for elk. Unlike deer hunting, elk hunters typically traverse through an area looking for a potential elk target whereas deer hunters typically remain in a stand known as a deer blind. Elk by nature are very vocal animals with the elk being the most vocal of all animals similar thereto. As such, there is a significant importance when it comes to learning how to call and elk. The hunter must first understand every sound that an elk makes and what it means. This can typically take some time to master, however, if you spend some time on listening to the vocalizations of elk you can begin to comprehend and interpret the different sounds of an elk.

One parameter that hunters consider while elk calling and elk hunting is that both the bulls and cows vocalize throughout the day. Archery and muzzle loader season dates are often set around the rut, which is usually the peak time for elk vocalization. Both bulls and cows are very active and very vocal which makes the rut one of the best times to hunt. Elk use vocalizations to locate each other and also to notify other elk of danger. The types of elk vocalizations can be broken into a couple different types of elk calls. Chirps are often used by cow elk and sometimes bulls. A chirp is a vocalization that is made when elk are around each other. Mews are highly variable elk calls and vocalizations. They can be used to illustrate threats, submission, sparring between bulls, or just a simple communication from cow to bull, cow to her calf or locating other elk. Another common vocalization that elk make is what is referred to as a bark. Barks sound very pointed and very abrupt. Elk typically use barks as an alert call, letting a group know that there is danger present.

In order to mimic the aforementioned elk sounds, a plurality of elk calls are available. The most well-known elk call is referred to as the bugle. Bull elk bugle typically for different reasons such as but not limited to a sign of dominance or as a means to locate other elk. Bugling can be an effective call to not only locate a bull during the rut, but can also be effective to call in a bull to your location. Another popular elk call is referred to as the chuckle. The chuckle call is a series of grunts following a bugle. Understanding the elk calls that elk vocalize at any given time and more specifically during a rut, you can understand which elk calls you should take when you go on that elk hunting trip. While conventional elk calls are known in the art, the present invention provides clear improvement over the aforementioned conventional elk calls.

It is intended within the scope of the present invention to provide an elk call that is formed to replicate an elk's esophagus and be able to assist a hunter create a bugle call as well as project thrashing sounds.

SUMMARY OF THE INVENTION

It is the object of the present invention to provide an elk call that is operable to attract elk during times such as but not limited to a rut wherein the present invention includes a tubular body wherein the tubular body has a hollow passage extending therethrough.

Another object of the present invention is to provide a wild game call configured to assist a hunter in producing a call so as to attract game such as elk wherein the tubular body of the present invention includes a first end and a second end.

A further object of the present invention is to provide an elk call that is operable to attract elk during times such as but not limited to a rut wherein the present invention includes a baffle secured to the second end of the tubular body.

Still another object of the present invention is to provide a wild game call configured to assist a hunter in producing a call so as to attract game such as elk wherein the baffle is configured to assist in producing a thrashing sound.

An additional object of the present invention is to provide an elk call that is operable to attract elk during times such as but not limited to a rut wherein the tubular body is wrapped with foam insulation to improve the sound quality being emitted therefrom.

Yet a further object of the present invention is to provide a wild game call configured to assist a hunter in producing a call so as to attract game such as elk wherein the tubular body is wrapped in an outer covering such as but not limited to leather or artificial leather.

Still a further object of the present invention is to provide an elk call that is operable to attract elk during times such as but not limited to a rut wherein the tubular body includes a mouth baffle secured to the first end thereof.

Another object of the present invention is to provide a wild game call configured to assist a hunter in producing a call so as to attract game such as elk wherein the mouth baffle includes diametrically opposing notches in the outer edge thereof.

Yet an additional object of the present invention is to provide an elk call that is operable to attract elk during times such as but not limited to a rut wherein the tubular body further includes a strap secured thereto.

A further of the present invention is to provide a wild game call configured to assist a hunter in producing a call so as to attract game such as elk wherein the outer covering is provided in a bright color for safety.

A further object of the present invention is to provide an elk call that is operable to attract elk during times such as but not limited to a rut wherein the wall of the tubular body is flexible and approximately one eighth inch in thickness.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
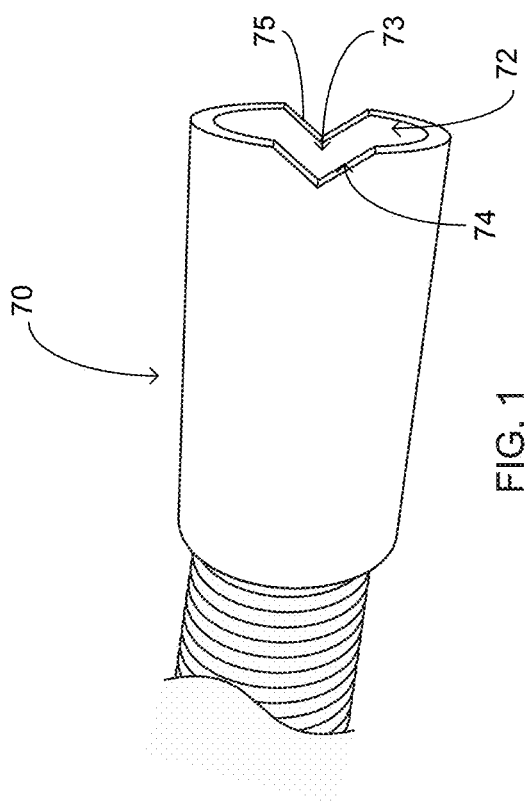
FIG. 1 is a detailed view of an end baffle of the present invention.
Figure 2:
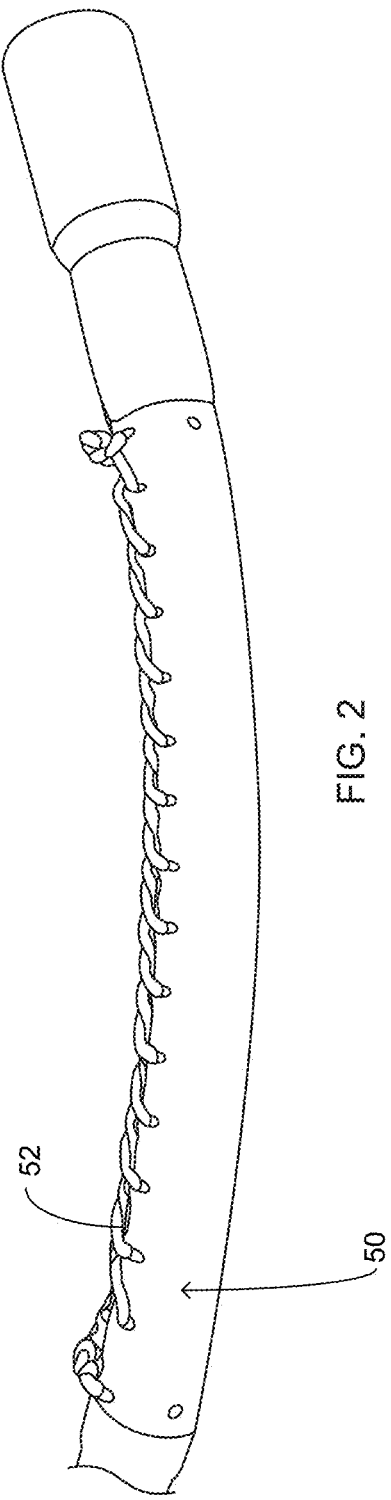
FIG. 2 is a perspective view of the present invention wrapped in an outer covering.
Figure 3:
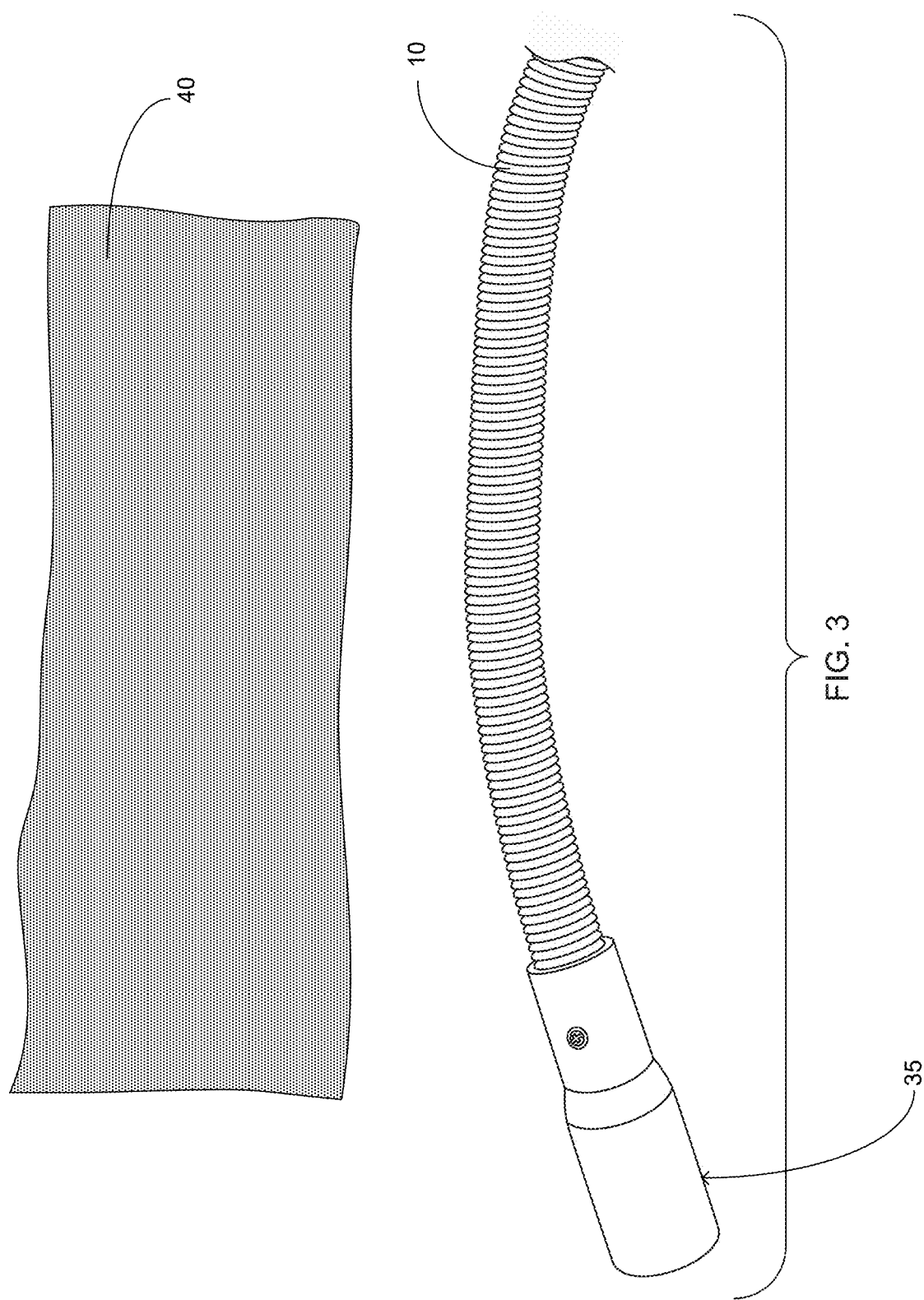
FIG. 3 is a view of the insulation of the present invention adjacent a portion of the body of the present invention.

Referring now to the drawings submitted herewith, wherein various elements depicted therein are not necessarily drawn to scale and wherein through the views and figures like elements are referenced with identical reference numerals, there is illustrated an elk call 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the elk call 100 includes a body 10 wherein the body 10 is tubular in form having a first end 11 and a second end 12. The body 10 includes an opening 13 at first end 11 and an opening 14 at the second end having a hollow passage 15 extending therethrough. The body 10 includes an exterior surface 20 that has ridges 22 formed thereon. The ridges 22 provide a desired sound effect if a user rakes the elk call 100 against a tree during an elk hunt. In a preferred embodiment the body 10 has a circumference between one inch and two and a half inches. The body 10 is manufactured from flexible plastic tubing and it should be understood within the scope of the present invention that the body 10 could be provided in alternate lengths.

Figure 4:
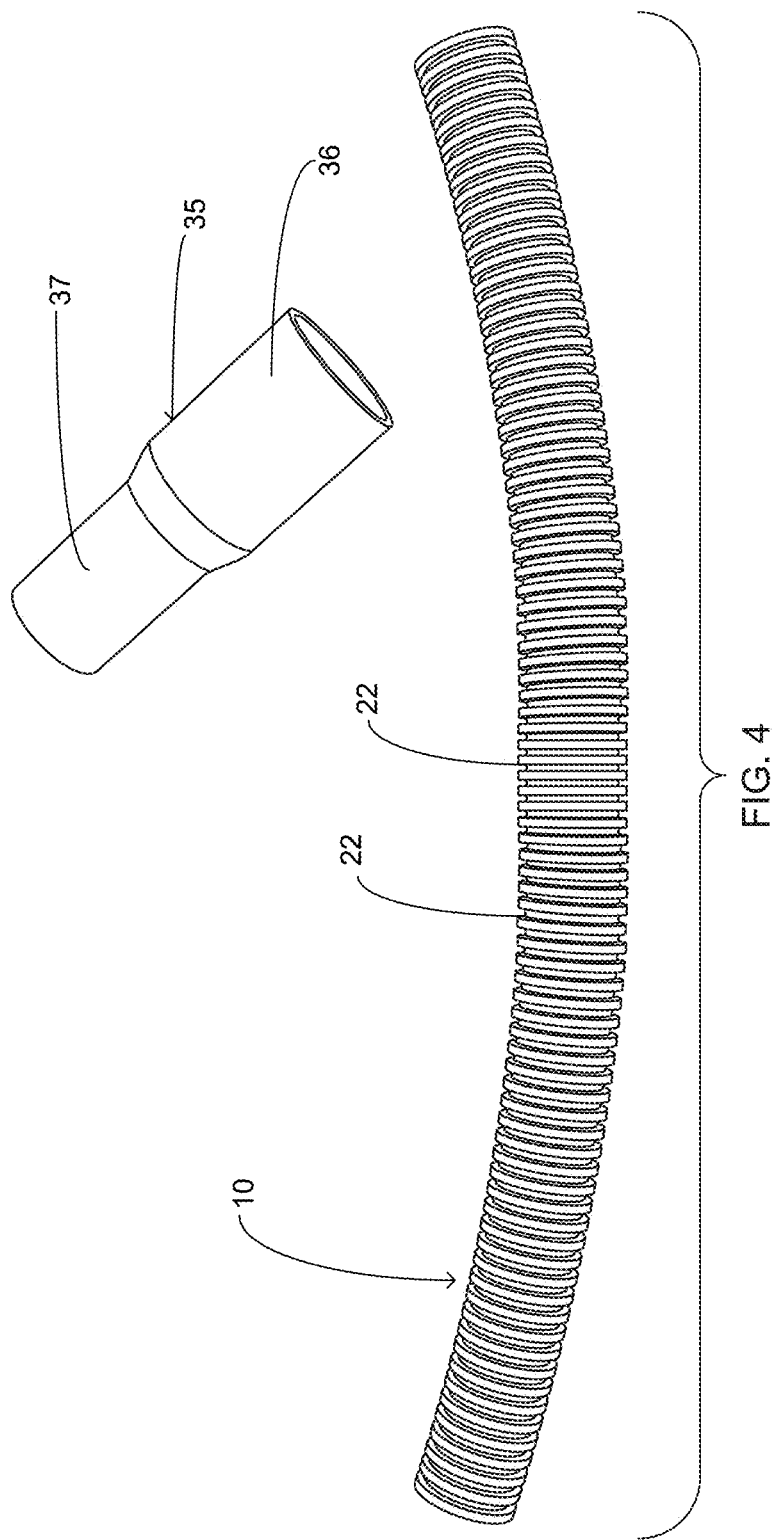
FIG. 4 is a detailed view of the body of the present invention and a mouthpiece that be operably coupled thereto.
Figure 5:
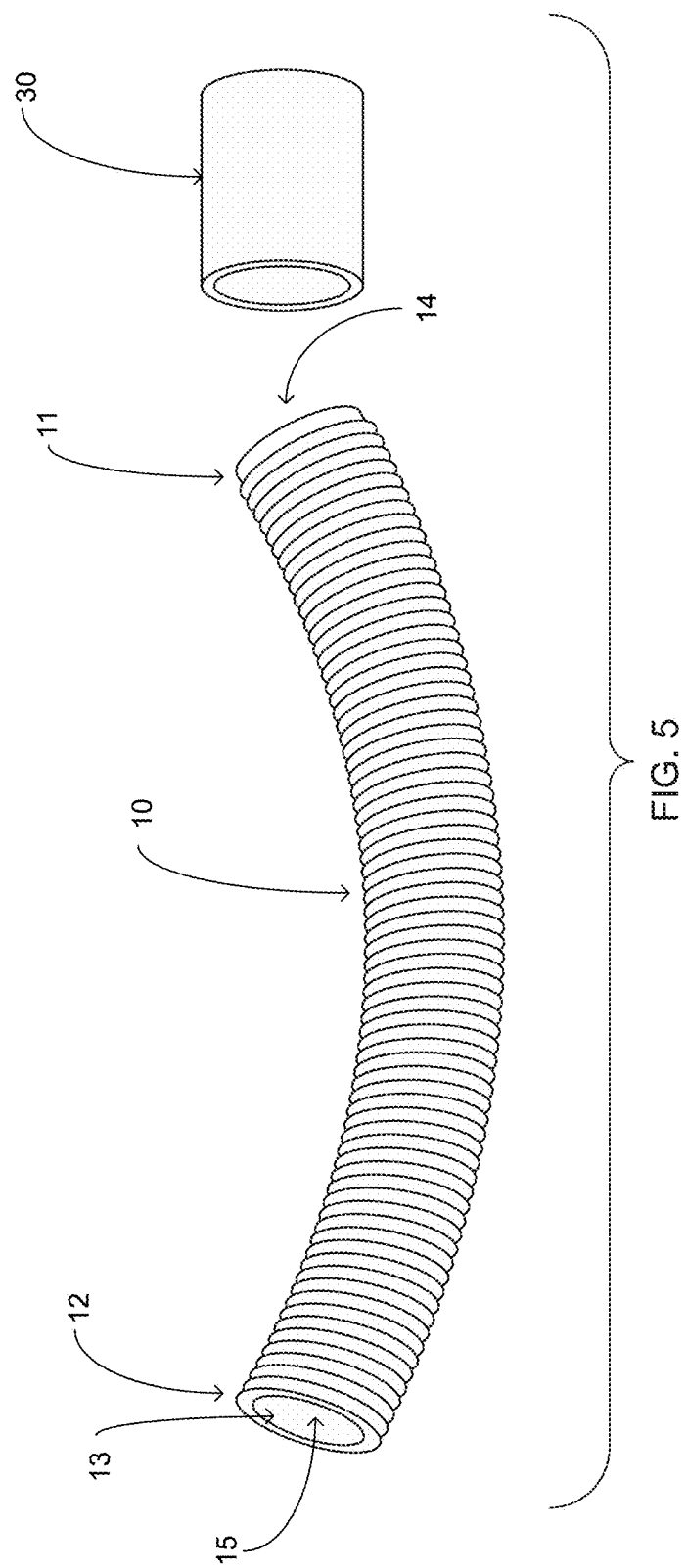
FIG. 5 is a detailed view of the body of the present invention adjacent an alternate embodiment of a mouthpiece that can be operably coupled to the body.

Operably coupled to the first end 11 of the body 10 is mouthpiece 30. Mouthpiece 30 is manufactured from suitable material such as but not limited to plastic tubing and is configured to slidably couple with the first end 11 of the body 10. The mouthpiece 30 is provided having a suitable diameter for a user to blow thereinto. FIG. 4 illustrates an alternative embodiment of the mouthpiece 35 wherein mouthpiece 35 includes a first portion 36 and second portion 37 that are contiguously formed. Second portion 37 has a diameter that is less than that of the diameter of the first portion 36. The formation of the mouthpiece 35 provides an alternate airflow into the body 10 and can produce a desired sound effect different than that of the mouthpiece 30. It is contemplated within the scope of the present invention that the elk call 100 could employ various alternate shapes and sizes of mouthpieces and achieve the desired objective of providing an interface for a user to blow air into the body 10.

The body 10 is wrapped with insulation 40. The insulation 40 is manufactured from a material such as but not limited to foam and is secured to the body 10 utilizing suitable durable techniques. The insulation 40 is employed to provide a desired sound effect when utilizing the body 10 for raking as well as during production of an elk call made by blowing into the mouthpiece 30. It should be understood within the scope of the present invention that the insulation 40 could be manufactured from alternate materials as well as be provided in alternate thicknesses.

The body 10 is further wrapped in an outer covering 50. The outer covering provides coverage of the insulation 40 and is secured to the body 10 utilizing tie members 52. In a preferred embodiment of the elk call 100, the outer covering 50 is manufactured from leather. The combination of the insulation 40 and the outer covering 50 functions to inhibit noise created by the elk call 100 when a user is walking with and carrying the elk call 100. While leather is employed in the preferred embodiment of the present invention for the outer covering 50, it should be understood that the outer covering 50 could be manufactured from alternate materials.

The elk call 100 has operably coupled to the second end 12 of the body 10 a baffle member 70. The baffle member 70 is manufactured from a durable suitable material such as but not limited to plastic tubing. The baffle member 70 is secured to the body 10 utilizing suitable techniques and can be permanently or releasably secured. The baffle member 70 includes opening 72 leading to hollow passage 73. A first notch 74 and a second notch 75 are formed in the wall of the baffle member 70. The first notch 74 and second notch 75 are diametrically opposed on the baffle member 70 across the opening 72. The first notch 74 and second notch 75 function to provide a desired sound effect as the user blows air into the opposing end of the body 10. The first notch 74 and second notch 75 provide an exit flow path for the air exiting the elk call 100 so as to produce a more desirable sound effect.

While not particularly illustrated herein, it is contemplated within the scope of the present invention could further include a whistle member or an introduction valve either embedded into or operably coupled to the mouthpiece 30 so as to produce a desired alternate sound effect.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. An elk call configured to attract elk wherein the elk call comprises:
    a body, said body being tubular in shape and hollow, said body having a first end and a second end, said body having an opening at said first end, said body having an opening at said second end, said body having an exterior surface;
    an insulation layer, said insulation layer configured to be wrapped around said body, said insulation layer being manufactured from foam;
    an outer covering, said outer covering being superposed said insulation layer and wrapped therearound;
    a mouthpiece, said mouthpiece being operably coupled to said first end of said body, said mouthpiece having a hollow passage formed therethrough, said mouthpiece being configured to allow a user of the elk call to introduce air into said body; and
    a baffle member, said baffle member being operably coupled to said second end of said body, said baffle member being cylindrical in shape having an outer wall, said baffle member having an opening distal to said body, said outer wall proximate said opening having a first notch and a second notch formed on an edge of the outer wall proximate said opening.

2. The elk call configured to attract elk as recited in claim 1, wherein said first notch and said second notch are diametrically opposed across said opening of said baffle member.

3. The elk call configured to attract elk as recited in claim 2, wherein said outer covering is manufactured from leather.

4. The elk call configured to attract elk as recited in claim 3, wherein said mouthpiece has a diameter that is consistent across a length thereof.

5. The elk call configured to attract elk as recited in claim 3, wherein said mouthpiece includes a first portion and a second portion contiguously formed, wherein said first portion has a diameter greater than a diameter of said second portion.

6. The elk call configured to attract elk as recited in claim 5, wherein said body has a circumference of one to two and a half inches.

7. The elk call configured to attract elk as recited in claim 6, wherein said exterior surface of said body has ridges formed thereon, said ridges operable to make a noise upon engagement with a tree.

* * * * *